United States Patent
Niwa et al.

[11] Patent Number: 4,500,455
[45] Date of Patent: Feb. 19, 1985

[54] REACTIVE DISPERSE DIAMINOPYRIDINE AZO DYES CONTAINING A FLUOROSTRIAZINE GROUP

[75] Inventors: Toshio Niwa; Toshio Hihara; Yukiharu Shimizu, all of Kanagawa, Japan

[73] Assignee: Mitsubishi Chemical Industries, Limited, Tokyo, Japan

[21] Appl. No.: 400,533

[22] Filed: Jul. 21, 1982

[30] Foreign Application Priority Data

Jul. 21, 1981 [JP] Japan ................. 56-114231

[51] Int. Cl.³ .................. C09B 62/085; D06P 1/382; D06P 3/66; D06P 3/84
[52] U.S. Cl. ..................... 534/635; 534/655; 534/756; 534/766; 534/773
[58] Field of Search ......................... 260/153

[56] References Cited

U.S. PATENT DOCUMENTS 4,017,477 4/1977 Hegar et al. ............... 260/153
4,067,864 1/1978 Oesterlein et al. ........... 260/153

Primary Examiner—Floyd D. Higel
Attorney, Agent, or Firm—Sughrue, Mion, Zinn, Macpeak & Seas

[57] ABSTRACT

Diaminopyridine dyes for dyeing cellulose-containing fibers, particularly cellulose fibers and polyester-cellulose fibers in from orange to bluish red, with excellent fastness to light. The dyes are represented by the formula (I):

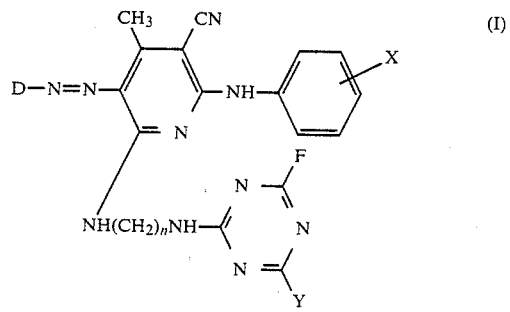

wherein

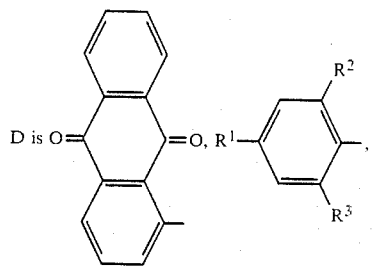

-continued

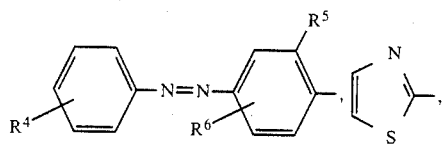

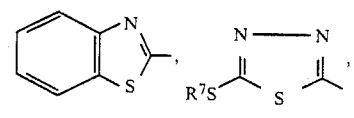

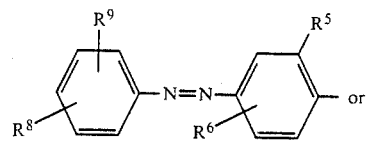

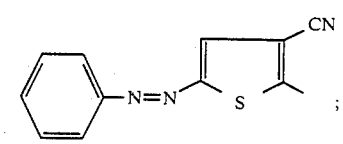

X is a hydrogen atom, or a halogen atom;
Y is an alkoxy group containing from 1 to 5 carbon atoms, $-O-R^{10}-O-R^{11}$, or a phenoxy group; and
n is 2 or 3, and wherein $R^1$ is a nitro group, a cyano group, a methylsulfonyl group, a phenylsulfonyl group, a mono- or di-lower alkylaminosulfonyl group, an acetyl group, or a benzoyl group; $R^2$ and $R^3$ are each a hydrogen atom, a trifluoromethyl group, a halogen atom, or a cyano group; $R^4$ is a hydrogen atom, a lower alkyl group, a mono- or di-lower alkylaminosulfonyl group, a mono- or di-lower alkylcarbamoyl group, or an acetylamino group; $R^5$ and $R^6$ are each a hydrogen atom, a halogen atom, or a lower alkyl group; $R^7$ is a lower alkyl group; $R^8$ is a hydrogen atom or a halogen atom; $R^{10}$ is an ethylene group, or a propylene group; and $R^{11}$ is a methyl group, or an ethyl group.

3 Claims, No Drawings

REACTIVE DISPERSE DIAMINOPYRIDINE AZO DYES CONTAINING A FLUOROSTRIAZINE GROUP

FIELD OF THE INVENTION

The present invention relates to diaminopyridine dyes for cellulose-containing fibers, and more particularly, to reactive diaminopyridine dyes for dyeing cellulose-containing fibers, particularly cellulose fibers and polyester-cellulose fibers in from orange to bluish red having excellent fastness to light, etc.

SUMMARY OF THE INVENTION

The present invention relates to diamino-pyridine dyes for cellulose-containing fibers, represented by the general formula (I):

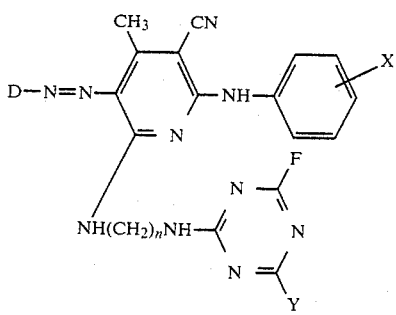

wherein

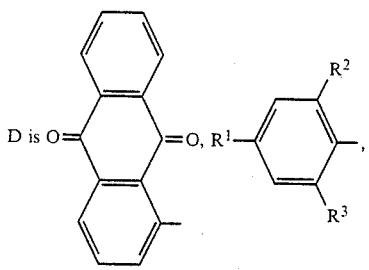

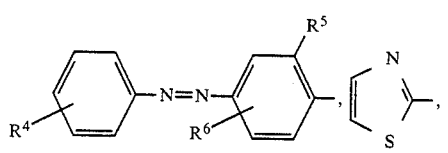

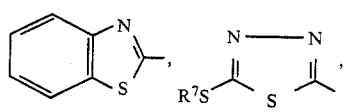

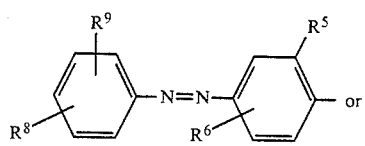

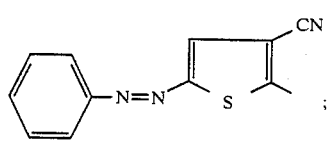

X is hydrogen or a halogen atom;

Y is an alkoxy group containing from 1 to 5 carbon atoms, $-O-R^{10}-O-R^{11}$, or a phenoxy; and n is 2 or 3 (wherein $R^1$ is a nitro group, a cyano group, a methylsulfonyl group, a phenylsulfonyl group, a mono- or dilower alkylaminosulfonyl group, an acetyl group, or a benzoyl group; $R^2$ and $R^3$ are each a hydrogen atom, a trifluoromethyl group, a halogen atom, or a cyano group; $R^4$ is a hydrogen atom, a lower alkyl group, a mono or dilower alkylaminosulfonyl group, a mono- or di-lower alkylcarbamoyl group, or an acetylamino group; $R^5$ and $R^6$ are each a hydrogen atom, a halogen atom, or a lower alkyl group; $R^7$ is a lower alkyl group; $R^8$ is a trifluoromethyl group, or a halogen atom; $R^9$ is a hydrogen atom, or a halogen atom; $R^{10}$ is an ethylene group, or a propylene group; and $R^{11}$ is a methyl group, or an ethyl group).

DETAILED DESCRIPTION OF THE INVENTION

The dyes represented by the general formula (I) can be easily prepared, for example, by reacting the compounds represented by the general formula (IV):

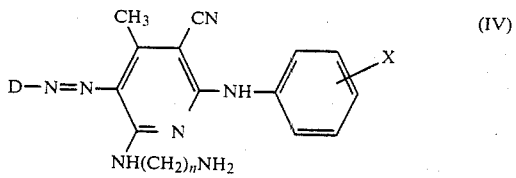

(wherein D, X and n are the same as described for the general formula (I)) with the compounds represented by the general formula (V):

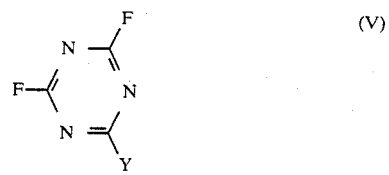

(wherein Y is the same as described for the general formula (I)) in N-methyl-2-pyrrolidone.

Halogen atoms indicated by X, $R^2$, $R^3$, $R^5$, $R^6$, $R^8$ and $R^9$ in the general formulae (I) and (IV) include a fluorine atom, a chlorine atom, and a bromine atom.

Lower alkyl groups indicated by $R^4$, $R^5$, $R^6$ and $R^7$ include a methyl group, an ethyl group, and straight or branched alkyl groups containing from 3 to 4 carbon atoms.

Mono- or di-lower alkylaminosulfonyl groups indicated by $R^1$ and $R^4$ include a methylaminosulfonyl group, an ethylaminosulfonyl group, an isopropylaminosulfonyl group, an isopropylaminosulfonyl group, an n-propylaminosulfonyl group, an n-butylaminosulfonyl group, a sec-pentylaminosulfonyl group, an n-hexylaminosulfonyl group, a dimethylaminosulfonyl group, a diethylamino-sulfonyl group, and a di(n-propyl)aminosulfonyl group.

Mono- or di-lower alkylcarbamoyl groups indicated by $R^4$ include a methylcarbamoyl group, an ethylcarbamoyl group, an isopropylcarbamoyl group, an n-butylcarbamoyl group, an n-propylcarbamoyl group, a sec-pentylacarbamoyl group, an n-hexylcarbamoyl group, a dimethylcarbamoyl group, and a di(n-propyl)carbamoyl group.

In preparing the diaminopyridine dyes represented by the general formula (I), the azo compounds represented by the general formula (IV) are reacted with the difluorotriazines represented by the general formula (V), the molar ratio of the difluorotriazine to the azo compound being from 1.0 to 1.2, in an organic solvent, e.g., acetone, methyl ethyl ketone, dioxane, N,N-dimethylformamide, N-methyl-2-pyrrolidone, and dimethyl sulfoxide, at a temperature of from 0° C. to room temperature.

In this case, if necessary, a tertiary amine, e.g., triethylamine and tributylamine, can be used as an acid binding agent.

A precipitate formed on discharging the above obtained reaction solution into water is separated by a technique, such as filtration and centrifugal separation. Thus, the diaminopyridine dyes of the general formula (I) can be obtained.

Cellulose-containing fibers which are dyed by the diaminopyridines of the invention include natural fibers, e.g., cotton and jute, semi-synthetic fibers, e.g., viscose rayon and copper-ammonia rayon, partially aminated or acylated cellulsoe fibers, and their fabrics, e.g., woven fabrics and unwoven fabrics, and so forth.

In addition, mixed fibers of the above described fibers with other fibers such as polyester fibers, cation dyeable polyester fibers, anion dyeable polyester fibers, polyamide fibers, wool, acryl fibers, urethane fibers, diacetate fibers, and triacetate fibers, and their fabrics can be dyed. Of the above described fibers and fabrics, cellulose fibers, mixed fibers of cellulose fibers and polyester fibers, and their fabrics are particularly suitable for dyeing with the diaminopyridine dyes of the invention.

In the practice of dyeing using the diaminopyridine dyes of the invention, it is preferred for the dyes to be finely dispersed in a medium to the extent that the particle size is from about 0.5 to 2µ. This can be achieved by various techniques such as a method in which a water-soluble dispersant, such as a nonionic, e.g., Pluronic, surface active agent, or an anionic dispersant, e.g., sodium ligninsulfonate, and a sodium salt of a naphthalenesulfonic acid-formalin condensate, is used and the dye is dispersed finely in water by the use of a grinder, such as a sand grinder and a mill; a method in which a water sparingly soluble or water-insoluble dispersant, e.g., compounds derived by addition of small moles of ethylene oxide to sulfosuccinic acid esters, nonylphenol or the like, is used, and the dye is dispersed in a solvent other than water, such as alcohols, e.g., ethyl alcohol, isopropyl alcohol, and polyethylene glycol, ketones, e.g., acetone, and methyl ethyl ketone, hydrocarbons, e.g., n-hexane, toluene, xylene, and mineral turpentine, halogenated hydrocarbons, e.g., tetrachloroethylene, esters, e.g., ethyl acetate and butyl acetate, ethers, e.g., dioxane, and tetraethylene glycol dimethyl ether, or mixtures thereof; and a method in which the dye is dispersed finely in a mixed solvent of water and a solvent compatible with water in any proportion, selected from the above described solvents.

At the step of finely dispersing the diaminopyridine dyes of the invention, polymeric compounds soluble in the dispersants, surface active agents which have mainly functions other than the dispersion action, and so forth can be added.

This fine dye dispersion can be used as such as a padding bath for use in a padding dyeing method, or as a printing color paste for use in a printing method. In practical use, however, the fine dye dispersion is diluted with water, a mixed solvent of water and a solvent compatible with water in any proportions, or an o/w type emulsion or w/o type emulsion in which the oil phase is a petroleum hydrocarbon, e.g., mineral turpentine, or a halogenated hydrocarbon, e.g., tetrachloroethylene, to the desired level determined depending on the desired dyeing concentration and, thereafter, is used as a padding bath or a printing color paste.

In the preparation of such padding baths and printing color pastes, it is possible to add cellulose fiber swelling agents in order to advantageously perform dyeing, or to add alkali metallic compounds, organic epoxy compounds, organic vinyl compounds, etc., as acid binding agent for the purpose of accelerating the reaction between the dyes and the cellulose fibers.

Alkali metallic compounds which can be used include alkali metal carbonic acid salts and, additionally, alkali metal aliphatic acid salts, such as alkali metal hydrocarbonic acid salts, alkali metal phosphoric acid salts, alkali metal boric acid salts, alkali metal silicic acid salts, alkali metal hydroxides, and alkali metal acetic acid salts, and alkali precursor compounds, such as sodium trichloroacetate and sodium acetoacetate, which release alkalis when heated in the presence of water.

The amount of the alkali metallic compound being used is usually sufficient to be such that the pH of the padding bath or printing color paste becomes from 7.5 to 8.5. Organic epoxy compounds which can be used include ethylene glycol diglycidyl ether, and polyethylene glycol diglycidyl ether having an average molecular weight of from 150 to 400. Organic vinyl compounds which can be used include ethylene glycol diacrylate, and polyethylene glycol diacrylate or dimethacrylate having an average molecular weight of from 150 to 400. The amount of the organic epoxy compound or organic vinyl compound used is from about 3 to 6% by weight based on the padding bath or printing color paste.

In order to prevent dry migration in the course of padding dyeing, or to regulate the color paste viscosity to the optimum level in each printing method, a tackifier, such as a water-soluble polymer, e.g., sodium alginate, may be added.

The preparation of the padding bath or printing color paste is not limited to the above described procedure. Also, it is not always required for the cellulose swelling agent or acid binding agent to be present in the padding bath or printing color paste, and the cellulose swelling agent or acid binding agent may be incorporated into the fibers in advance.

Any cellulose fiber swelling agents can be used as long as they have a boiling point of at least 150° C. and have the effect of swelling the cellulose fibers. Examples of such cellulose fiber swelling agents include ureas such as N,N,N',N'-tetramethylurea, polyhydric alcohols such as polyethylene glycol and polypropylene glycol, and their derivatives. Of these compounds, polyhydric alcohol derivatives which are prepared by dimethylating or diacetylating both terminal hydroxy groups of polyethylene glycol, polypropylene glycol, or the like having an average molecular weight of from about 200 to 500 and which are inactive with reactive groups of dye are particularly preferred as cellulose fiber swelling agents.

The amount of the cellulose fiber swelling agent being used is appropriately from about 5 to 25% by weight, preferably from about 8 to 15% by weight, based on the padding bath or printing color paste.

Dyeing of the above-described cellulose-containing fibers using the diaminopyridine dyes of the invention can be performed by the usual techniques. For example, a cellulose-containing fiber material is impregnated or printed with a padding bath or printing color paste as prepared by the above described method and dried and, thereafter, it is heat-treated with hot air or superheated vapor maintained at 160 to 220° C. for 30 seconds to 10 minutes, or in high pressure saturated steam maintained at 120° to 150° C. for 3 to 30 minutes, and washed with hot water containing a surface active agent, or an o/w or w/o type emulsion washing bath in which the oil phase is a halongenated hydrocarbon, such as tetrachloroethylene, or by a usual dry cleaning method.

Thus there can be obtained dyed products which are dyed sharply and uniformly, and which have good light fastness and wet color fastness.

The following examples are given to illustrate the invention in greater detail. All parts are by weight.

EXAMPLE 1

A dye composition consisting of 15 parts of disazo dye represented by the formula:

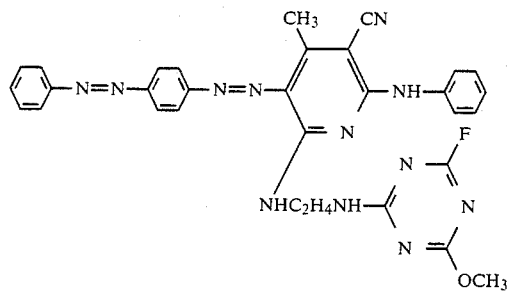

15 parts of a naphthalenesulfonic acid-formaldehyde condensate, and 70 parts of water was processed by the use of a paint shaker as a finely dispersing apparatus to prepare a dye dispersion.

The dye dispersion thus prepared was used to prepare a printing color paste having the following composition.

|  | parts |
| --- | --- |
| Dye dispersion | 6.5 |
| 5% Aqueous solution of sodium alginate | 55 |
| Polyethylene glycol dimethyl ether having an average molecular weight of 400 | 9 |
| Water | 29.5 |
|  | 100 (pH 8.0) |

The printing color paste was printed on a polyester/cotton mixed cloth (mixing ratio: 65/35) by the use of a screen printing machine, was subjected to preliminarily drying at 80° C. for 3 minutes and then, was fixed by dry heating at 215° C. for 90 seconds. After being washed with water, the printed cloth was subjected to soaping using a washing solution containing 2 g/liter of a nonionic surface active agent (Scourol #900 (trade name, produced by Kao Soap Co., Ltd.) at a bath ratio of 1:30 at 80° C. for 20 minutes, and there was thus obtained a dyed product which was yellowish red having excellent light fastness and wet color fastness.

The dye used in this example was prepared as follows:

4-Aminoazobenzene was diazonated by the usual method and coupled to 2-anilino-3-cyano-4-methyl-6-(β-aminoethylamino)pyridine to prepare a dye. Then, 4.75 g of the dye was dissolved in 80 ml of N-methyl-2-pyrrolidone, and 1.9 g of 2,4-difluoro-6-methoxytriazine and 1.2 g of triethylamine were added thereto and stirred at 0° to 5° C. for 3 hours. The reaction solution was added dropwise to 1,500 ml of water, and the thus obtained precipitate was separated by filtration and dried under reduced pressure to obtain 5.9 g of yellow red powdery compound represented by the above-described formula. For this dye, $\lambda_{max}$(acetone) was 490 nm.

EXAMPLE 2

A dye composition consisting of 15 parts of monoazo dye represented by the formula:

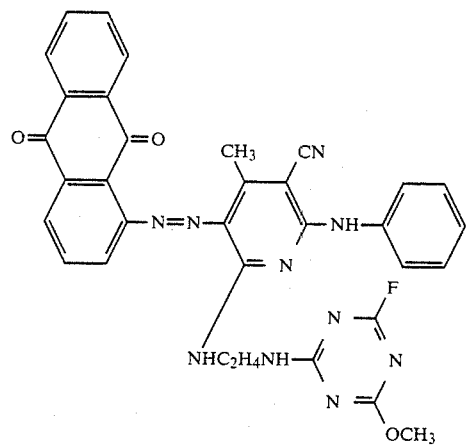

10 parts of Pluronic surface active agent (Pluronic L 64 (trade name), produced by Asahi Denka Co., Ltd.), and 75 parts of water was processed by the use of a sand grinder as a finely dispersing apparatus to prepare a dye dispersion. The dye dispersion thus prepared was used to prepare a printing color paste having the following composition:

|  | parts |
| --- | --- |
| Dye dispersion | 7 |
| 5% Aqueous solution of sodium alginate | 55 |
| Polyethylene glycol diacetate having an average molecular weight of 300 | 10 |
| Polyethylene glycol diglycidyl ether having an average molecular weight of 200 | 3 |
| Water | 25 |
|  | 100 (pH 6.5) |

The thus prepared printing color paste was printed on a cotton broad cloth (cotton yarn number: 40) which has been subjected to a silket processing, by the use of a screen printing machine, was subjected to preliminarily drying at 80° C. for 3 minutes, and was processed using superheated steam at 185° C. for 7 minutes.

Thereafter, the same washing processing as in Example 1 was performed, and there was thus obtained a reddish brown dyed product having excellent light fastness and wet color fastness.

The dye used in this example was prepared as follows:

1-Aminoanthraquinone was diazonated by the usual method and coupled to 2-anilino-3-cyano-3-cyano-4-methyl-6-(β-aminoethylamino)pyridine to prepare a dye. The thus prepared dye was then reacted with 2,4-difluoro-6-methoxytriazine by the use of tri-n-butylamine as an acid binding agent in N-methyl-2-pyrrolidone to obtain the desired dye. For this dye, $\lambda_{max}$ (acetone) was 485 nm.

EXAMPLE 3

A dye composition consisting of 10 parts of monoazo dye represented by the formula:

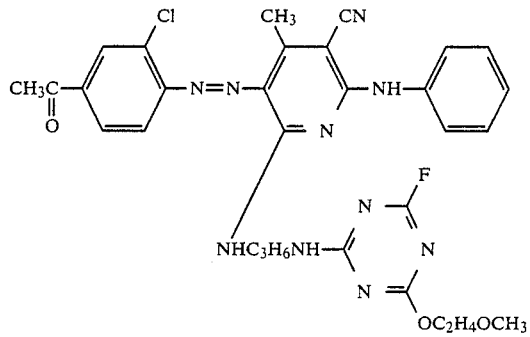

2 parts of polyoxyethylene glycol nonylphenyl ether (HLB: 8.9), and 88 parts of diethylene glycol diacetate was ground by the use of a paint conditioner as a finely dispersing apparatus to prepare a dye ink.

A mixture of 10 parts of the dye ink and 55 parts of mineral turpentine was gradually added to 35 parts of an aqueous solution having the composition as shown hereinafter while stirring with a homomixer (5,000 to 7,000 rpm) until a uniform solution was obtained, and there was thus prepared a viscous o/w type emulsion color paste.

| Composition of Aqueous Solution | parts |
| --- | --- |
| Water | 31 |
| Repitol G (special nonionic surface active agent (trade name), produced by Dai-ichi Kogyo Seiyaku Co., Ltd.) | 3.8 |
| Sodium trichloroacetate | 0.1 |
| | 34.9 |

The thus prepared color paste was printed on a polyester/cotton mixed cloth (mixing ratio: 65/35) by the use of a screen printing machine, dried at 100° C. for 2 minutes, and then, processed with superheated steam at 175° C. for 7 minutes. Thereafter, the printed cloth was washed with a heated tetrachloroethylene bath containing a small amount of water and dried, and there was thus obtained a golden dyed product which had excellent light fastness and wet color fastness, and was free from staining in the white background.

The dye used in this example was prepared as follows:

2-Chloro-4-methylcarbonylaniline was diazonated by the usual method and coupled to 2-anilino-3-cyano-4-methyl-6-(γ-aminopropylamino)pyridine to prepare a dye. The dye thus prepared was then reacted with 2,4-difluoro-6-methoxyethoxytriazine in dimethyl sulfoxide by the use of triethylamine as a deoxidizing agent to obtain the desired dye. For this dye, $\lambda_{max}$ (acetone) was 467 nm.

EXAMPLE 4

A dye composition consisting of 16 parts of disazo dye represented by the formula:

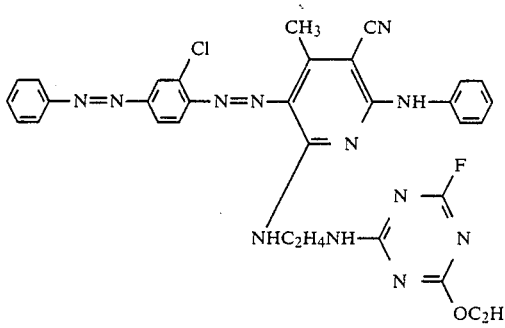

7 parts of polyoxyethylene glycol nonylphenyl ether (HLB: 13.3), 3 parts of a naphthalenesulfonic acid-formaldehyde condensate, and 74 parts of water was finely dispersed by the use of a sand grinder to prepare a dye dispersion.

The dye dispersion was then used to prepare a padding solution having the following composition:

| | parts |
| --- | --- |
| Dye dispersion | 6 |
| Tetraethylene glycol dimethyl ether | 15 |
| Water | 79 |
| | 100 (pH 8.0) |

A polyester/cotton mixed cloth (mixing ratio: 65/35) was impregnated with the above prepared padding bath and squeezed at a squeezing ratio of 45% and, thereafter, was dried at 100° C. for 2 minutes and fixed by dry heating at 200° C. for 1 minute. The cloth was then washed with a heated ethanol bath, and there was thus obtained a red dyed product having excellent light fastness and wet color fastness.

The dye used in this example was prepared in the same manner as in Example 1. For this dye, $\lambda_{max}$ (acetone) was 503 nm.

EXAMPLE 5

Printing was performed in the same manner as in Example 1 except that a nylon/rayon mixed cloth (mixing ratio: 50/50) was used and the dry heating fixing temperature was 185° C., whereby there was obtained a red dyed product having good wet color fastness and light fastness.

EXAMPLE 6

Using the azo dyes shown in Table 1, printing was performed in the same manner as in Example 1. All dyed products had good light fastness and wet color fastness. The hue of dyed cloth and $\lambda_{max}$ (acetone) of each dye are shown in Tables 1 and 2.

TABLE 1
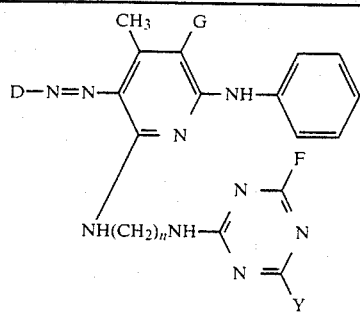
| No. | D— | —G | n | —Y | Hue of Dyed Cloth | $\lambda_{max}$ (acetone) (nm) |
|---|---|---|---|---|---|---|
| 1 | anthraquinonyl | —CN | 2 | —OC₂H₄OC₂H₅ | reddish brown | 485 |
| 2 | ″ | ″ | 3 | —OC₃H₇(n) | ″ | 487 |
| 3 | ″ | ″ | 3 | —O—phenyl | ″ | 488 |
| 4 | 4-O₂N-phenyl | ″ | 2 | —OCH₃ | reddish orange | 470 |
| 5 | ″ | ″ | 3 | —OC₂H₄OCH₃ | ″ | 472 |
| 6 | ″ | —CONH₂ | 2 | —OC₄H₉(n) | red | 487 |
| 7 | 2-CF₃-4-O₂N-phenyl | —CN | 2 | —O—phenyl | ″ | 486 |
| 8 | ″ | —CONH₂ | 2 | —OC₃H₆OCH₃ | deep red | 501 |
| 9 | 2-CN-4-O₂N-phenyl | —CN | 2 | —OCH₃ | ″ | 512 |
| 10 | ″ | ″ | 3 | —OC₂H₅ | ″ | 514 |
| 11 | 2-CN-4-O₂N-6-Cl-phenyl | ″ | 3 | —OCH₃ | bluish red | 514 |
| 12 | ″ | ″ | 3 | —OC₃H₆OC₂H₅ | ″ | 514 |
| 13 | ″ | —CONH₂ | 2 | ″ | ″ | 528 |

TABLE 1-continued
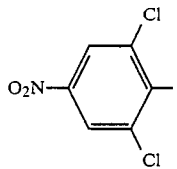
| No. | D— | —G | n | —Y | Hue of Dyed Cloth | λ$_{max}$ (acetone) (nm) |
|---|---|---|---|---|---|---|
| 14 | 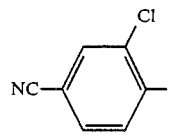 | —CN | 2 | —OCH$_3$ | reddish brown | 492 |
| 15 | " | " | 2 | —OC$_3$H$_7$(i) | " | 492 |
| 16 | 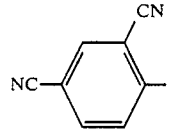 | " | 2 | —OCH$_3$ | reddish orange | 473 |
| 17 | " | " | 3 | " | " | 475 |
| 18 | 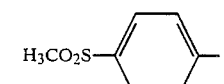 | " | 3 | —OC$_2$H$_5$ | yellowish red | 493 |
| 19 | " | —CONH$_2$ | 3 | " | bluish red | 505 |
| 20 | 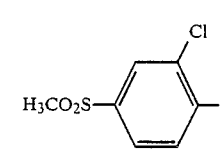 | " | 3 | " | orange | 470 |
| 21 | 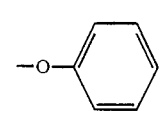 | —CN | 2 | —OCH$_3$ | " | 472 |
| 22 | " | " | 2 | 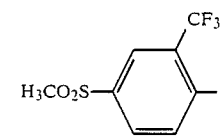 | " | 472 |
| 23 | 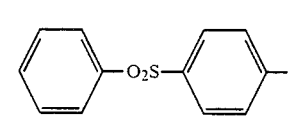 | " | 2 | —OC$_2$H$_5$ | " | 476 |
| 24 | " | —CONH$_2$ | 2 | —OC$_2$H$_4$OC$_2$H$_5$ | yellowish red | 487 |
| 25 |  | —CN | 2 | —OCH$_3$ | golden | 471 |

TABLE 1-continued
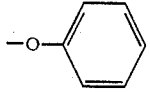
| No. | D— | —G | n | —Y | Hue of Dyed Cloth | λ$_{max}$ (acetone) (nm) |
|---|---|---|---|---|---|---|
| 26 | " | " | 3 | 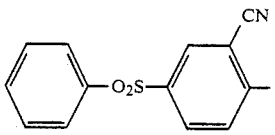 | " | 472 |
| 27 | 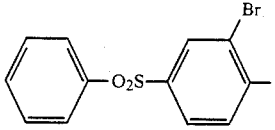 | " | 3 | —OC$_4$H$_9$(sec) | red | 491 |
| 28 | 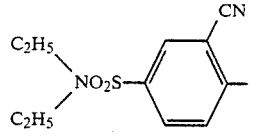 | " | 3 | —OC$_2$H$_5$ | orange | 473 |
| 29 | " | —CONH$_2$ | 2 | —OCH$_3$ | yellowish red | 484 |
| 30 | 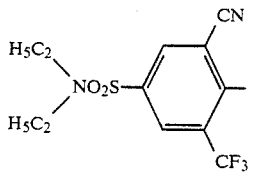 | —CN | 2 | " | orange | 468 |
| 31 | 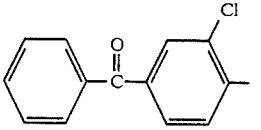 | —CONH$_2$ | 2 | " | red | 502 |
| 32 | " | " | 2 | —OC$_2$H$_5$ | " | 502 |
| 33 | 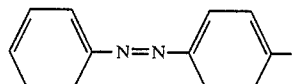 | —CN | 2 | —OCH$_3$ | orange | 471 |
| 34 | " | " | 2 | —OC$_2$H$_4$OC$_2$H$_5$ | " | 471 |
| 35 |  | " | 2 | —OC$_2$H$_5$ | yellowish red | 490 |
| 36 | " | " | 2 | —OC$_2$H$_4$OCH$_3$ | " | 490 |
| 37 | " | " | 3 | —OCH$_3$ | " | 490 |
| 38 | " | " | 3 | —OC$_4$H$_9$(n) | " | 490 |
| 39 | " | —CONH$_2$ | 3 | —OCH$_3$ | red | 502 |

TABLE 1-continued

[Structure: pyridine core with CH₃ and G substituents, D—N=N— azo group, NH-phenyl, NH(CH₂)ₙNH— linker to triazine bearing F and Y groups]

| No. | D— | —G | n | —Y | Hue of Dyed Cloth | λ_max (acetone) (nm) |
|-----|-----|-----|---|-----|-------------------|----------------------|
| 40 | [phenyl-N=N-(3-Br,4-)phenyl] | —CN | 2 | " | " | 502 |
| 41 | " | " | 2 | —O-phenyl | " | 502 |
| 42 | [3-Cl-phenyl-N=N-(2,5-diCH₃)phenyl] | " | 2 | —OC₂H₅ | " | 504 |
| 43 | " | —CONH₂ | 3 | —OCH₃ | bluish red | 514 |
| 44 | [2-CH₃-phenyl-N=N-(3-CH₃,4-)phenyl] | —CN | 2 | " | yellowish red | 495 |
| 45 | " | —CONH₂ | 2 | —OC₃H₇OC₂H₅ | red | 507 |
| 46 | [2-C₄H₉(n)-phenyl-N=N-(3-Br,5-CH₃,4-)phenyl] | —CN | 2 | " | " | 508 |
| 47 | " | " | 2 | —OCH₃ | " | 508 |
| 48 | [2-Cl-phenyl-N=N-(3-Cl,4-)phenyl] | " | 2 | " | bluish red | 511 |
| 49 | " | " | 3 | " | " | 509 |
| 50 | [phenyl-N=N-(3-CF₃,4-)phenyl] | —CONH₂ | 3 | —OC₃H₇(i) | " | 513 |
| 51 | " | —CN | 3 | —OCH₃ | red | 503 |

TABLE 1-continued

[Structure: pyridine core with CH₃ and G substituents, D-N=N- azo group, NH-phenyl, and NH(CH₂)ₙNH- linked to triazine bearing F and Y]

| No. | D— | —G | n | —Y | Hue of Dyed Cloth | λ_max (acetone) (nm) |
|-----|-----|-----|---|-----|-------------------|----------------------|
| 52 | H₃CNHO₂S—C₆H₄—N=N—C₆H₄— | " | 2 | —OCH₃ | " | 503 |
| 53 | " | " | 2 | —OC₂H₅ | " | 503 |
| 54 | (H₃C)₂NO₂S—C₆H₄—N=N—C₆H₃(Cl)— | " | 2 | —OCH₃ | " | 511 |
| 55 | " | " | 2 | —OC₂H₄OCH₃ | " | 512 |
| 56 | (H₅C₂)₂NO₂S—C₆H₄—N=N—C₆H₂(C₂H₅)₂— | " | 2 | " | " | 504 |
| 57 | " | —CONH₂ | 3 | —O—C₆H₅ | bluish red | 519 |
| 58 | " | " | 3 | —OCH₃ | " | 520 |
| 59 | (n)H₁₃C₆—NH—NO₂S—C₆H₄—N=N—C₆H₂(Br)₂— | —CN | 2 | " | " | 518 |
| 60 | " | " | 2 | —OC₂H₅ | " | 518 |
| 61 | (n)H₉C₄—NH—NO₂S—C₆H₄—N=N—C₆H₃(Cl)— | " | 2 | —OCH₃ | red | 511 |
| 62 | " | " | 2 | —O—C₆H₅ | " | 512 |

TABLE 1-continued

[Structure: pyridine core with CH₃ and G substituents, D—N=N— group, NH-phenyl, and NH(CH₂)ₙNH— linked to a triazine ring with F and Y substituents]

| No. | D— | —G | n | —Y | Hue of Dyed Cloth | λmax (acetone) (nm) |
|---|---|---|---|---|---|---|
| 63 | [2-(SO₂NHC₂H₅)phenyl-N=N-2,5-dimethylphenyl] | " | 3 | —OCH₃ | " | 504 |
| 64 | " | —CONH₂ | 3 | " | bluish red | 520 |
| 65 | [H₃C-C(=O)-NH-phenyl-N=N-(3-CF₃-4-methyl)phenyl] | —CN | 2 | " | deep red | 512 |
| 66 | " | " | 2 | —OC₂H₅ | " | 512 |
| 67 | [(i)H₇C₃-N(H)-C(=O)-phenyl-N=N-4-methylphenyl] | " | 2 | —OCH₃ | red | 503 |
| 68 | " | " | 2 | —OC₅H₁₁(n) | " | 504 |
| 69 | [3-CF₃-phenyl-N=N-(4-methyl-2-t-C₄H₉)phenyl] | —CONH₂ | 3 | —OCH₃ | bluish red | 521 |
| 70 | " | " | 3 | —OC₅H₁₁(iso) | " | 521 |
| 71 | [2-thiazolyl] | —CN | 2 | —OCH₃ | orange | 471 |
| 72 | " | " | 3 | —O-phenyl | " | 471 |
| 73 | " | —CONH₂ | 3 | —OCH₃ | yellowish red | 484 |
| 74 | " | —CN | 3 | —OC₂H₅ | orange | 470 |
| 75 | [2-benzothiazolyl] | " | 2 | —OCH₃ | " | 474 |
| 76 | " | —CONH₂ | 2 | —OC₂H₄OCH₃ | yellowish red | 485 |

TABLE 1-continued

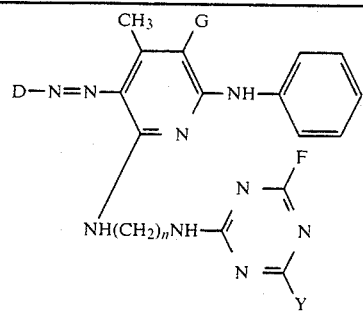

| No. | D— | —G | n | —Y | Hue of Dyed Cloth | $\lambda_{max}$ (acetone) (nm) |
|---|---|---|---|---|---|---|
| 77 | (n)H₇C₃S–C(=N–N=C(CH₃)₂)–S | —CN | 3 | —OC₃H₇(n) | red | 494 |
| 78 | " | " | 3 | —OC₃H₆OCH₃ | " | 494 |
| 79 | " | —CONH₂ | 3 | —OCH₃ | bluish red | 511 |
| 80 | (n)H₉C₄S–C(=N–N=C(CH₃)₂)–S | —CN | 2 | " | red | 494 |
| 81 | " | " | 3 | " | " | 492 |

TABLE 2

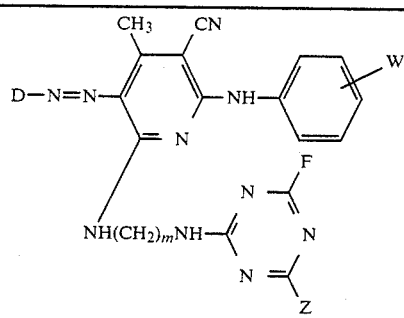

| No. | D— | m | W (aryl substituent) | —Z | Hue of Dyed Cloth | $\lambda_{max}$ (acetone) (nm) |
|---|---|---|---|---|---|---|
| 1 | 1-methylanthraquinon-... yl | 2 | 3-Cl | —OC₂H₄OC₂H₅ | reddish brown | 483 |
| 2 | 2-CF₃-4-NO₂-phenyl | 2 | 2-Cl | —OCH₃ | red | 485 |
| 3 | " | 3 | 4-F | —OC₂H₅ | " | 487 |
| 4 | 2-CN-3-Cl-4-NO₂-... | 2 | 3-Br | —O-phenyl | bluish red | 512 |

TABLE 2-continued

[Structure: pyridine core with CH₃, CN substituents, D—N=N— group, NH-aryl(W) group, NH(CH₂)ₘNH— linked to triazine ring with F and Z substituents]

| No. | D— | m | -W (aryl) | —Z | Hue of Dyed Cloth | λmax (acetone) (nm) |
|---|---|---|---|---|---|---|
| 5 | ″ | 2 | 2-F-phenyl | —OCH₃ | ″ | 512 |
| 6 | 3-Cl-4-(CH₃O₂S)-phenyl | 2 | 2-Cl-phenyl | —OC₃H₇(n) | orange | 470 |
| 7 | ″ | 3 | 3-F-phenyl | ″ | ″ | 472 |
| 8 | 4-(C₆H₅O₂S)-phenyl | 2 | 3-Cl-phenyl | —OC₂H₄OCH₃ | golden | 469 |
| 9 | 3-Cl-4-((C₂H₅)₂NO₂S)-phenyl | 2 | 3-Cl-phenyl | —OC₃H₆OC₂H₅ | ″ | 461 |
| 10 | C₆H₅—N=N—C₆H₄— | 2 | 4-Cl-phenyl | —OC₂H₅ | yellowish red | 489 |
| 11 | ″ | 3 | 3-Br-phenyl | —OC₄H₉(t) | ″ | 489 |
| 12 | 3-Cl-4-(C₆H₅N=N)-phenyl | 2 | 3-Cl-phenyl | —OCH₃ | ″ | 499 |
| 13 | 4-Cl-C₆H₄—N=N—(2-CH₃-phenyl)— | 2 | 4-Cl-phenyl | —OCH₃ | red | 501 |
| 14 | ((C₂H₅)₂NO₂S)-C₆H₄—N=N—(2-CH₃-phenyl)— | 2 | phenyl | —OC₂H₅ | ″ | 503 |
| 15 | ″ | 3 | phenyl | —O—C₆H₅ | ″ | 505 |

TABLE 2-continued

Structure:
D—N=N— attached to a central ring with CH₃, CN, NH(CH₂)ₘNH— groups, linked to phenyl-W and to a triazine bearing F and Z substituents.

| No. | D— | m | W (phenyl) | —Z | Hue of Dyed Cloth | λ_max (acetone) (nm) |
|---|---|---|---|---|---|---|
| 16 | " | 2 | 3-Cl-phenyl | —OCH₃ | " | 501 |
| 17 | 4-[(n-C₃H₇)₂NO₂S]-phenyl—N=N—(3-methyl-4-)phenyl | 2 | phenyl | —OC₃H₇(n) | red | 503 |
| 18 | " | 2 | 2-F-phenyl | —OC₂H₄OCH₃ | " | 501 |
| 19 | 3,4-di-Cl-phenyl—N=N—(2-C₂H₅-4-)phenyl | 2 | phenyl | —OCH₃ | deep red | 505 |
| 20 | 2,4-di-F-phenyl—N=N—(2-CH₃-4-)phenyl | 2 | phenyl | —O—phenyl | " | 505 |
| 21 | " | 2 | 2-Cl-phenyl | —OC₄H₉(sec) | " | 503 |
| 22 | 3,5-di-Br-phenyl—N=N—(3-Cl-4-)phenyl | 2 | phenyl | —OC₃H₇(i) | " | 507 |
| 23 | " | 3 | " | —OCH₃ | " | 508 |
| 24 | 4-Cl-2-CF₃-phenyl—N=N—(3-C₂H₅-4-)phenyl | 2 | " | —OC₂H₅ | " | 505 |
| 25 | " | 3 | 3-Br-phenyl | —OC₂H₄OCH₃ | " | 506 |
| 26 | 2,6-di-Cl-phenyl—N=N—(2,5-di-CH₃-4-)phenyl | 2 | 3-Cl-phenyl | —OC₅H₁₁(n) | " | 507 |

TABLE 2-continued

[Structure: pyridine core with substituents CH₃, CN, D—N=N—, —NH—phenyl-W, NH(CH₂)ₘNH— linked to a triazine bearing F, and —Z substituent]

| No. | D— | m | W-phenyl | —Z | Hue of Dyed Cloth | λmax (acetone) (nm) |
|---|---|---|---|---|---|---|
| 27 | 4-Cl-3-CF₃-phenyl—N=N—(2-C₂H₅, 4-CH₃, 5-C₃H₇(i))phenyl | 2 | phenyl | —OC₄H₉(t) | " | 507 |
| 28 | " | 2 | " | —O-phenyl | " | 507 |
| 29 | " | 3 | 3-Cl-phenyl | —OC₂H₄OC₂H₅ | " | 508 |
| 30 | 2,5-diCl-phenyl—N=N—(3-C₂H₅, 4-CH₃)phenyl | 2 | phenyl | —OC₃H₆OCH₃ | " | 506 |
| 31 | 4-Br-2-Cl-phenyl—N=N—(3-CF₃, 4-CH₃)phenyl | 3 | 2-F-phenyl | —OCH₃ | " | 509 |
| 32 | thiazol-2-yl | 2 | 3-Cl-phenyl | —OC₂H₅ | orange | 468 |
| 33 | benzothiazol-2-yl | 2 | 4-Cl-phenyl | —OC₃H₇ | " | 468 |
| 34 | H₅C₂S—C(=N—N=C(CH₃)₂)—S— | 2 | phenyl | —OC₂H₅ | red | 494 |
| 35 | " | 2 | 3-Cl-phenyl | —OC₂H₅ | " | 492 |
| 36 | phenyl—N=N—(2-CH₃, 3-CN)thien-5-yl | 2 | phenyl | —OC₅H₁₁(sec) | reddish blue | 594 |
| 37 | " | 3 | " | —OC₂H₅ | " | 595 |
| 38 | " | 2 | 3-Cl-phenyl | —OC₃H₇(i) | " | 592 |

TABLE 2-continued

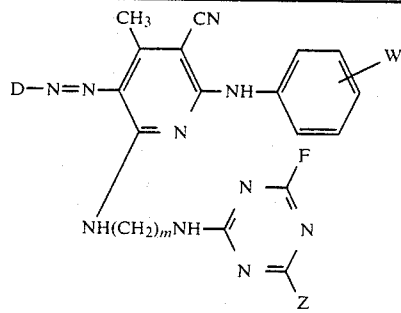

| No. | D— | m | 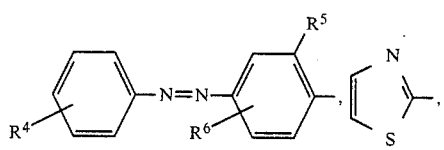 W | —Z | Hue of Dyed Cloth | $\lambda_{max}$ (acetone) (nm) |
|---|---|---|---|---|---|---|
| 39 | " | 3 | Cl | —OC$_4$H$_9$(sec) | " | 593 |

While the invention has been described in detail and with reference to specific embodiments thereof, it will be apparent to one skilled in the art that various changes and modifications can be made therein without departing from the spirit and scope thereof.

What is claimed is:

1. A diaminopyridine dye for cellulose-containing fibers, represented by the formula (I):

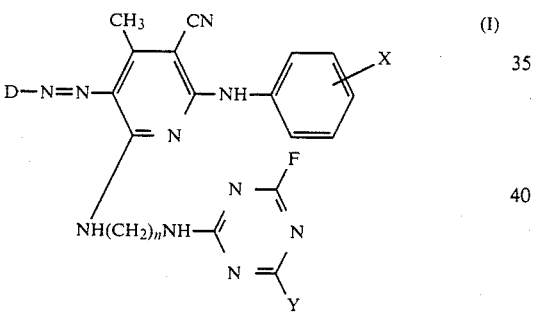 (I)

wherein

D is 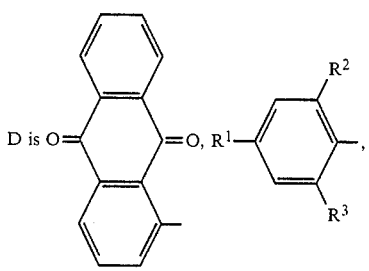

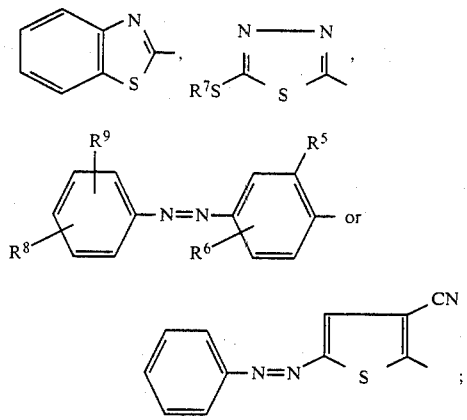

X is hydrogen or halogen;
Y is alkoxy containing from 1 to 5 carbons, —O—R$^{10}$—O—R$^{11}$, or phenoxy; and
n is 2 or 3
wherein R$^1$ is nitro, cyano, methylsulfonyl, phenylsulfonyl, mono- or di-lower alkylaminosulfonyl, acetyl, or benzoyl; R$^2$ and R$^3$ are each hydrogen, trifluoromethyl, halogen, or cyano; R$^4$ is hydrogen, lower alkyl, mono- or di-lower alkylaminosulfonyl, mono- or di-lower alkylcarbamoyl, or acetylamino; R$^5$ and R$^6$ are each hydrogen, halogen, or lower alkyl; R$^7$ is lower alkyl; R$^8$ is trifluoromethyl, or halogen; R$^9$ is hydrogen, or halogen; R$^{10}$ is ethylene, or propylene; and R$^{11}$ is methyl, or an ethyl.

2. The diaminopyridine dye as claimed in claim 1, represented by the formula (II):

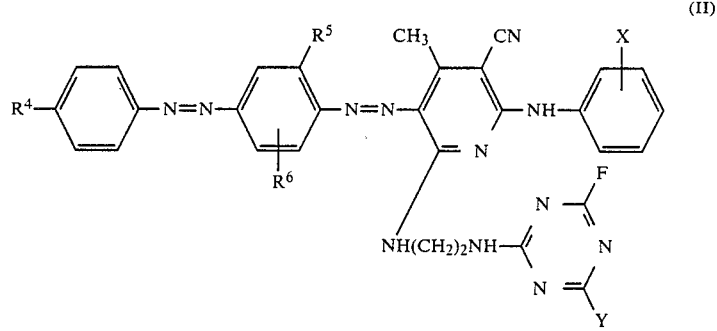

wherein
X is hydrogen, or halogen;
Y is alkoxy containing from 1 to 5 carbons, —O—$R^{10}$—O—$R^{11}$, or phenoxy;
$R^4$ is hydrogen, lower alkyl, mono- or di-lower alkylaminosulfonyl, mono- or di-lower alkylcarbamoyl, or acetylamino;
$R^5$ and $R^6$ are each hydrogen, halogen, or lower alkyl;
$R^{10}$ is ethylene, or propylene; and
$R^{11}$ is methyl, or ethyl.

3. The diaminopyridine dye as claimed in claim 1, represented by the formula (III):

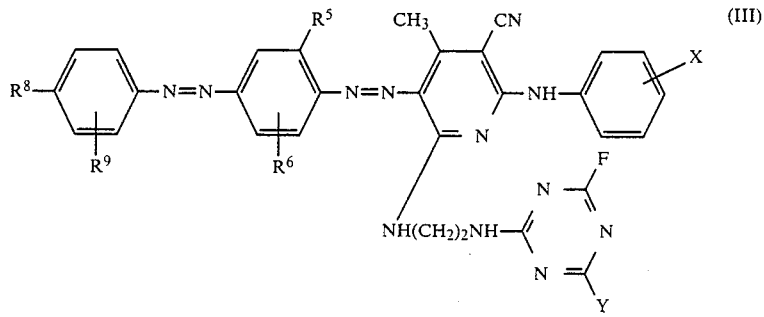

wherein
X is hydrogen, or halogen;
Y is alkoxy containing from 1 to 5 carbons, —O—$R^{10}$—O—$R^{11}$, or phenoxy;
$R^5$ and $R^6$ are each hydrogen, halogen, or lower alkyl;
$R^8$ is trifluoromethyl, or halogen;
$R^9$ is hydrogen, or halogen;
$R^{10}$ is ethylene, or propylene; and
$R^{11}$ is methyl, or ethyl.

* * * * *